United States Patent
Wu et al.

(10) Patent No.: US 6,751,374 B2
(45) Date of Patent: Jun. 15, 2004

(54) LIGHT-SIGNAL DELAYING DEVICE

(75) Inventors: Yuying Wu, Matsudo (JP); Dong Xia, Fremont, CA (US)

(73) Assignee: Seikoh Giken Co., Ltd., Chiba-ken (JP)

( * ) Notice: Subject to any disclaimer, the term of this patent is extended or adjusted under 35 U.S.C. 154(b) by 198 days.

(21) Appl. No.: 10/044,992

(22) Filed: Jan. 15, 2002

(65) Prior Publication Data

US 2002/0061167 A1 May 23, 2002

(51) Int. Cl.$^7$ .................................................. G02B 6/24
(52) U.S. Cl. ........................... 385/25; 385/47; 385/147
(58) Field of Search ............................. 385/25, 39–50, 385/88–94, 147

(56) References Cited

U.S. PATENT DOCUMENTS 5,066,088 A * 11/1991 Davies et al. ................. 385/25
5,855,744 A * 1/1999 Halsey et al. .......... 204/192.12
6,356,377 B1 * 3/2002 Bishop et al. .............. 359/290

* cited by examiner

*Primary Examiner*—Akm Enayet Ullah
*Assistant Examiner*—Jerry T Rahll
(74) *Attorney, Agent, or Firm*—Venable LLP; Michael A. Sartori; Chad C. Anderson

(57) ABSTRACT

A light-signal delaying device according to the present invention includes a linear guide rail and a pair of stages mounted on the linear guide rail. The device further includes a V-groove holder mounted on one of the stages, a pair of optical fiber collimators secured to the V-groove holder, a pair of reflecting mirrors mounted on the other stage such that reflecting surfaces thereof meet each other at 90°, and an actuator engaging section for moving the stage along the linear guide rail.

7 Claims, 3 Drawing Sheets

LIGHT-SIGNAL DELAYING DEVICE

BACKGROUND OF THE INVENTION

1. Field of the Invention

The present invention relates to a light-signal delaying device in which a required amount of delay is given to each channel to correct the amount of delay of a light signal transmitted in parallel in each channel in an optical multiplex transmission system, particularly, in a multiple-wavelength multiplex high-speed transmission system. More specifically, the present invention concerns a light-signal delaying device in which the delay can be finely adjusted over a wide range and effects on the optical transmission system can be minimized.

2. Description of the Related Art

Several systems have been proposed as conventional light-signal delaying devices for use in optical ATM exchanges or the like. However, in most cases, the delay time is adjusted over a small range. For adjusting the delay time over a relatively wide range, an optical fiber collimator is generally used. Referring to FIG. 5, a conventional light-signal delaying device (disclosed in Japanese Unexamined Patent Application Publication No. 11-295529) will be described. In FIG. 5, reference numerals 501 and 502 denote first and second collimating lenses, respectively; reference numeral 503 denotes an input-side optical fiber; reference numeral 504 denotes an output-side optical fiber; and reference numeral 505 denotes a support block. A moving shaft 508 is rotated by a moving mechanism 506. A base 507 supports the moving shaft 508 and the first collimating lens 501. The symbol ΔL indicates the amount of change in the distance between the first collimating lens 501 and the second collimating lens 502.

In the light-signal delaying device shown in FIG. 5, collimated light is directly transmitted between a pair of optical collimators formed of the pair of first and second optical fibers 503 and 504 and the respective lenses 501 and 502. When the distance ΔL between the collimating lenses 501 and 502 is adjusted, the transmission time of an incoming and outgoing light signal can be delayed by moving the second collimating lens 502 along the optical axis by the moving mechanism 506, thus changing the distance between the collimating lens 501 and the collimating lens 502. In such a system, since the moving optical fiber 504 and the second collimating lens 502 move as the delay time is adjusted, a stress is exerted on the connection of the parts and the moving fiber 504. As a result, problems such as undesired positional deviation and damage to the moving fiber 504 may occur. Also, since it is not possible to avoid meandering during movement or positional deviation in the lateral direction in a driving mechanism having only the moving shaft 508, it is difficult to sufficiently reduce the misalignment between the optical axes of the opposed optical fiber collimators. Also, since an increase in insertion loss arising from insufficient control of the misalignment between the optical axes is inevitable, adjustment of the delay over a wide range is next to impossible.

FIG. 6 shows an example of the optical path in a conventional light-signal delaying device. In FIG. 6, reference numerals 601 and 602 denote a first optical fiber and a second optical fiber, respectively. First and second optical collimators 603 and 604 are arranged so as to correspond to the first and second optical fibers 601 and 602, respectively. A rectangular prism 605 can be moved in the direction shown by the arrow in FIG. 6. The symbol ΔL indicates a geometric variable distance between the incidence/exit end face of the rectangular prism 605 and the optical collimators 603 and 604.

In the light-signal delaying device shown in FIG. 6, since the light beam is transmitted through the rectangular prism 605 between the optical collimators 603 and 604, the light beam is reflected by an incidence boundary surface 605a and an exit boundary surface 605b of the rectangular prism 605. Therefore, losses due to Fresnel reflection at the incidence/exit boundary surfaces 605a and 605b are inevitable. The Fresnel loss is approximately 0.6 dB (=0.3 dB×2). Furthermore, when the reflected light returns to the light-signal transmission system via the first optical collimator 603, the luminous output becomes unstable, thereby causing adverse effects such as an increase in distortion or an error rate in the light-signal waveform. Also, in the light-signal delaying device shown in FIG. 6, while the rectangular prism 605 needs to be moved along the optical axis, a movement guide mechanism is not specified and an insertion loss is 2.5 dB according to reference literature. Accordingly, the configuration of the movement guide mechanism is unsatisfactory.

As described above, according to the conventional light-signal delaying device, it is extremely difficult to achieve adjustment of the delay over a wide range, a compact configuration, and low insertion-loss characteristics.

SUMMARY OF THE INVENTION

Accordingly, it is an object of the present invention to provide a compact light-signal delaying device in which a transmitted light signal can be given a desired amount of delay over a wide range and the insertion loss can be reduced, thereby producing no adverse effects on the optical transmission system.

In order to achieve the above objects, a light-signal delaying device according to the present invention includes a linear guide rail, a pair of stages engaged with the linear guide rail, a V-groove holder mounted on one of the stages, a pair of optical fiber collimators secured to the V-groove holder, a pair of reflecting mirrors mounted on the other stage in such a manner that reflecting surfaces thereof intersect at 90°, and an actuator for moving the stage on which the reflecting mirrors are mounted along the linear guide rail.

In the light-signal delaying device according to the present invention, one of the pair of stages to which the pair of optical fiber collimators is fixed is a fixed stage that is fixed at a predetermined position on the linear guide rail, the stage to which the pair of reflecting mirrors is fixed is a movable stage capable of moving along the linear guide rail, and each stage has a pressing mechanism for applying pressure in a direction perpendicular to the direction of movement of the linear guide rail to prevent a gap between the stages and the linear guide rail.

In the light-signal delaying device according to the present invention, each of the pair of optical fiber collimators is a GRIN lens having a pitch of 0.25, which is connected to an optical fiber, connecting end faces of the GRIN lens and the optical fiber are obliquely polished at 6° or more and connected to each other, and an anti-reflection film is formed on each light-beam incidence/exit end face.

In the light-signal delaying device according to the present invention, the pair of reflecting mirrors is a first reflecting mirror and a second reflecting mirror, which are arranged in such a manner that the reflecting surfaces meet each other at 90° and have an incidence angle and an exit angle of 45° with respect to incident light and exit light, respectively, the first reflecting mirror deflects the light beam incident from the first optical fiber collimator by 90° with respect to the optical axis, and reflects it toward the second reflecting mirror, and the second reflecting mirror deflects the incident light beam by 90° with respect to the optical axis, and reflects it along the optical axis of the second optical fiber collimator.

In the light-signal delaying device according to the present invention, the V-groove holder has two V-grooves formed in parallel, the pair of optical fiber collimators is arranged in the V-groove holder such that the optical axes are in parallel with each other, the pair of reflecting mirrors is secured to the movable stage such that each of them faces the corresponding one of the pair of optical fiber collimators, and the light beam propagating between the optical fiber collimators can be sent to and received from the reflecting mirrors with a low transmission loss.

In the light-signal delaying device according to the present invention, the actuator for moving the movable stage is based on any one of a motor-driven ball screw mechanism, an air-driven cylinder mechanism, and a manual ball screw mechanism.

In the light-signal delaying device according to the present invention, each of the pair of reflecting mirrors has a metal film or a multilayer dielectric film formed on the reflecting surface thereof.

In the light-signal delaying device according to the present invention, each optical fiber used in the optical fiber collimators is any of a single mode fiber, a mode-dispersion shift fiber, and a polarization preserving fiber.

DESCRIPTION OF THE PREFERRED EMBODIMENTS

Figure 1A:
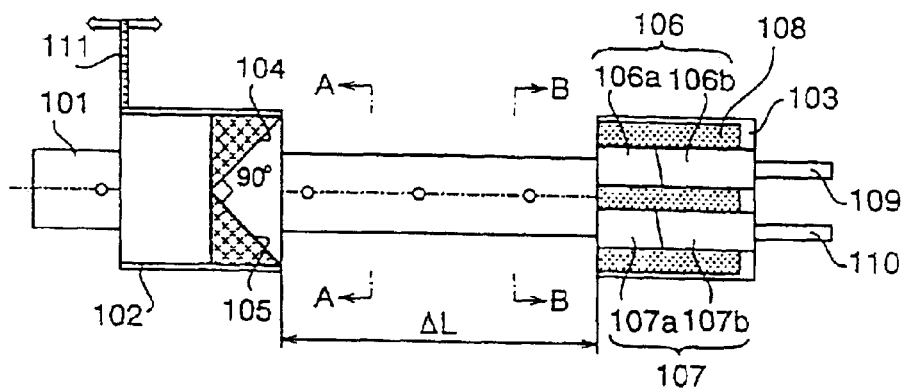
FIGS. 1A to 1C are schematic plane views showing the basic configuration of a light-signal delaying device according to the present invention.
Figure 1B:
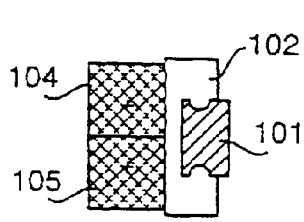
Figure 1C:
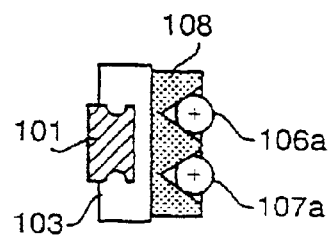

Referring to the drawings, the present invention will be specifically described hereinbelow. FIGS. 1A to 1C show the basic configuration of a light-signal delaying device according to the present invention. A linear guide rail 101 supports a movable translation stage (hereinafter, referred to as a movable stage) 102 and a fixed stage 103. The movable stage 102 has a first reflecting mirror 104 and a second reflecting mirror 105105, which are mounted thereon such that reflecting surfaces meet each other at 90°. The fixed stage 103 has a two-core V-groove holder 108 mounted thereon, in which two V-grooves are arranged in parallel. A first optical fiber collimator 106 and a second optical fiber collimator 107, each of which is made of a GRIN lens, are held in parallel in the respective V-grooves. Optical fibers 109 and 110 correspond to the first optical fiber collimator 106 and the second optical fiber collimator 107, respectively. The movable stage 102 connects to a driving section, which will be described later, via an actuator engaging section 111. The symbol ΔL denotes the distance between the optical fiber collimators 106 and 107 and the reflecting mirrors 104 and 105, that is, the stroke of the movable stage 102.

The fixed stage 103 has the first and second optical fiber collimators 106 and 107 mounted thereon and is secured at a predetermined position on the linear guide rail 101. The movable stage 102 has the reflecting mirrors 104 and 105 and can be moved along the linear guide rail 101. Furthermore, the fixed stage 103 and the movable stage 102 are provided with a pressing mechanism (not shown) for applying a pressure in a direction perpendicular to the direction of travel of the movable stage 102 along the linear guide rail 101 in order to prevent a gap between the stages 102 and 103 and the engaged linear guide rail 101.

Figure 2:
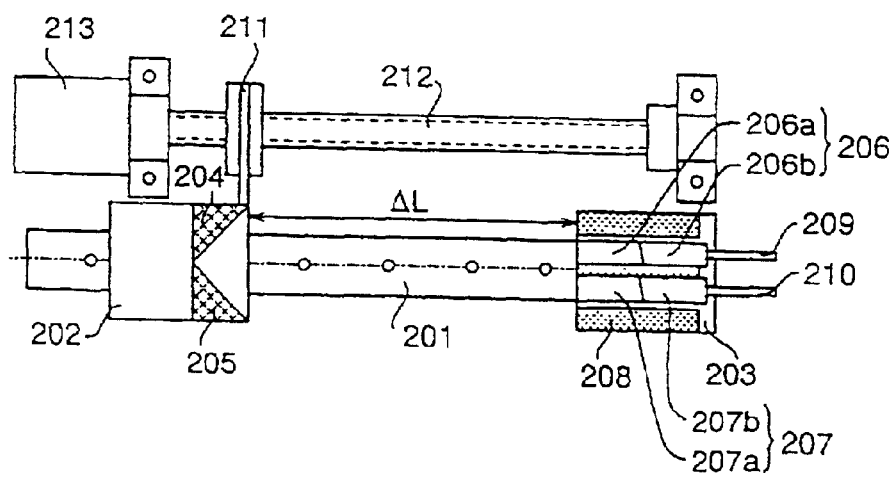
FIG. 2 is a schematic plane view showing a first embodiment of the light-signal delaying device according to the present invention.

The driving section is mounted on the movable stage 102 via the actuator engaging section 111 in order to move the movable stage 102. The driving section includes a small stepping motor 213 and a ball screw mechanism 212, as shown in FIG. 2.

The first optical fiber collimator 106 and the second optical fiber collimator 107 are arranged so as to correspond to the first reflecting mirror 104 and the second reflecting mirror 105, respectively. In other words, a light beam coming from a collimator 106a of the first optical fiber collimator 106 along the linear guide rail 101 is incident on the reflecting surface of the first reflecting mirror 104 at 45°, is reflected, is incident on the second reflecting mirror 105, is reflected, and then enters a collimator 107a of the second optical fiber collimator 107 along the linear guide rail 101. Thus, when the movable stage 102 is moved by the distance ΔL along the linear guide rail 101, the light beam emitted from the collimator 106a of the first optical fiber collimator 106 travels a distance of about 2ΔL until it enters the collimator 107a of the second optical fiber collimator 107. Accordingly, the delay of the light signal is in proportion to 2ΔL. Also, since the first and second reflecting mirrors 104 and 105 are arranged at 45° to the light emitted from the first optical fiber collimator 106 and incident on the second optical fiber collimator 107, the light may not be reflected and returned at the incidence surface of the reflecting mirrors 104 and 105.

The reflecting mirrors 104 and 105, in which a metal film or a multilayer dielectric film composed of aluminum (Al) or gold (Au) is formed on the oblique surface of a right prism, can be easily mounted and positioned. However, it is also possible to use a reflecting mirror in which, after a glass plate, a ceramic plate, or a metal plate is subjected to mirror finishing, the metal film or the multilayer dielectric film is formed thereon.

Each of the optical fiber collimators 106 and 107 is made of a small rod-shaped gradient index (GRIN) lens, for example, a GRIN lens having an outside diameter of 1.8 mm or 2.0 mm and a pitch of 0.25. This results in the cost of manufacturing the products being reduced, and optical-axis alignment and mounting on the optical axis being simplified due to the V-groove holder. Also, the divergence angle of the outgoing collimated light can be decreased to 0.1° or less, thereby allowing the light beam to be transmitted over a large distance with low loss.

Embodiments

FIG. 2 is a schematic plane view showing a first embodiment of the light-signal delaying device according to the present invention. A movable stage 202 is engaged with one side of a linear guide rail 201 in a movable manner, and a fixed stage 203 is secured to the other side thereof in an engaged state. The movable stage 202 has a first reflecting mirror 204 and a second reflecting mirror 205 fixed thereon, in which reflecting surfaces thereof are arranged so as to meet each other at 90°. The fixed stage 203 has a V-groove holder 208 having two parallel V-grooves formed thereon. A first optical fiber collimator 206 and a second optical fiber collimator 207, which are secured by the V-groove holder 208, are arranged along the V-grooves so as to face the reflecting surfaces of the reflecting mirrors 204 and 205 at 45°. The movable stage 202 is secured to a nut of a ball screw mechanism 212 via an actuator engaging section 211. Thus, the movable stage 202 is linearly moved along the linear guide rail 201 by the rotation of the ball screw mechanism 212. The ball screw mechanism 212 is driven and rotated by a stepping motor 213.

In the light-signal delaying device shown in FIG. 2, a light-beam transmission path is formed between the optical fiber collimators 206 and 207, each of which is made of a GRIN lens, via the reflecting mirrors 204 and 205, in a manner similar to that in FIGS. 1A to 1C. For example, a light beam from a collimator 206a of the first optical fiber collimator 206 is incident on the first reflecting mirror 204 at 45° toward the movable stage 202, is sequentially reflected by the first reflecting mirror 204 and the second reflecting mirror 205 at 45°, and then enters a collimator 207a of the second optical fiber collimator 207 in parallel with the incident light beam.

The ball screw mechanism 212 is driven by the stepping motor 213 to move the movable stage 202 along the linear guide rail 201 via the actuator engaging section 211. Thus, the distance between the reflecting mirrors 204 and 205 fixed to the movable stage 202 and the pair of optical fiber collimators 206 and 207 fixed to the fixed stage 203 varies. In other words, the optical distance traveled by the light beam emitted from the first optical fiber collimator 206 to the second optical fiber collimator 207 via the reflecting mirrors 204 and 205 varies. The stroke of the reflecting mirrors 204 and 205 is approximately 100 mm, and the variable delay of the light signal is in proportion to 2ΔL, thereby allowing a wide-range delay adjustment and a compact configuration to be achieved.

The distance between the optical fiber collimators 206 and 207 and the reflecting mirrors 204 and 205 varies according to an electric signal applied to the stepping motor 213. The optical path length of the light beam propagation varies between the two optical collimators depending on the direction of rotation of the motor and the number of driving pulses. The stepping motor 213 is a five-phase or two-phase stepping motor. Although a servomotor or a direct current motor can be used, it requires closed-loop control, thus requiring a complicated control circuit. Also, when a ball screw having a constant pitch is used, the resolution of the variable delay varies depending upon whether the stepping motor 213 is a five-phase motor or a two-phase motor. For example, when a two-phase stepping motor having a screw pitch of 1 mm is used, the resolution of the variable delay is about 0.17 ps. When a five-phase stepping motor is used, the resolution of the variable delay is about 0.0067 ps.

In FIG. 2, the ball screw mechanism 212 is driven by the stepping motor 213. Alternatively, a manual mechanism may be mounted instead of the stepping motor. In either case, the ball screw mechanism 212 is operated only when driven by an electric signal or by hand. Otherwise, the current state is maintained in the mechanism.

In the first embodiment shown in FIG. 2, the linear guide rail 201, the movable stage 202, the fixed stage 203, the first and second reflecting mirrors 204 and 205, and the first and second optical fiber collimators 207 and 208 are similar to the elements in FIGS. 1A to 1C and act similarly. In this embodiment, for example, when the stroke ΔL of the reflecting mirror is 50 mm, the variable delay amount is about 330 ps and the propagation loss of the light beam is 1.0 dB or less.

Figure 3:
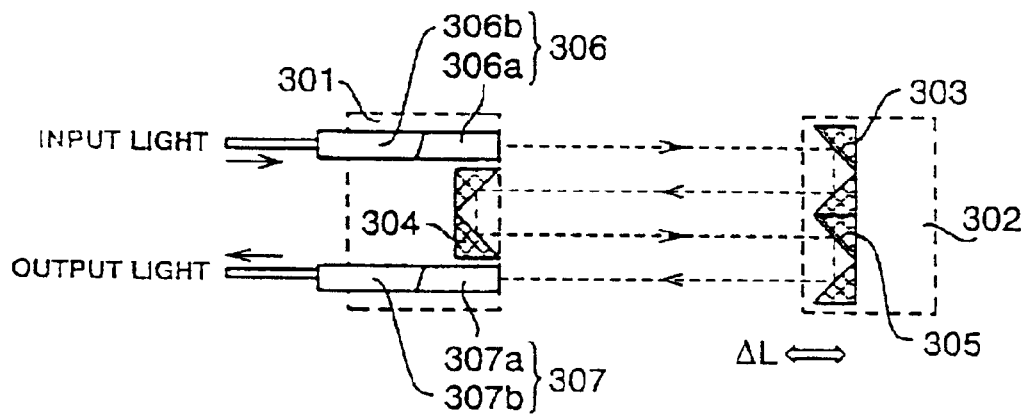
FIG. 3 is a schematic plane view showing a second embodiment of the light-signal delaying device (compact light-signal delaying device) according to the present invention.

FIG. 3 is a schematic plane view showing a second embodiment of the light-signal delaying device according to the present invention. This light-signal delaying device is miniaturized still further compared to the first embodiment. The traveling distance of the light beam is four times as long as the distance traveled by the movable stage. The fixed stage 301 and the movable stage 302 are mounted on a linear guide rail (not shown) in a manner similar to the first embodiment. A first reflecting mirror mechanism 303 and a third reflecting mirror mechanism 305 are mounted on the movable stage 302. A second reflecting mirror mechanism 304 is mounted on the fixed stage 301. A first optical fiber collimator 306 and a second optical fiber collimator 307 are mounted on the fixed stage 301. The symbol ΔL indicates the stroke of the movable stage 302.

Each of the reflecting mirror mechanisms 303, 304, and 305 shown in FIG. 3 is a pair of reflecting mirrors arranged such that reflecting surfaces meet each other at right angles, and acts in a manner similar to those shown in FIGS. 1 and 2. The fixed stage 301, the movable stage 302, the first optical fiber collimator 306, and the second optical fiber collimator 307 are similar to the elements shown in FIGS. 1 and 2, and act in a like manner.

Referring to FIG. 3, a light beam, which is emitted from a collimator 306a of the first optical fiber collimator 306 mounted on the fixed stage 301, is incident on the first reflecting mirror mechanism 303 mounted on the movable stage 302. In the first reflecting mirror mechanism 303, the incoming light beam is reflected twice, travels toward the fixed stage 301 again, and then is incident on the second reflecting mirror mechanism 304. Similarly, the light beam is sequentially reflected by the second reflecting mirror mechanism 304 and the third reflecting mirror mechanism 305, and then is incident on a collimator 307a of the second optical fiber collimator 307. As in the case of the first embodiment shown in FIGS. 1 and 2, when the movable stage 302 is moved along a linear guide rail, the distance traveled by the light beam, which is emitted from the collimator 306a of the first optical fiber collimator 306 and is incident on the collimator 307a of the second optical fiber collimator 307, is four times as long as the stroke of the movable stage 302, so that the variable delay amount is proportional to 4ΔL.

Figure 4:
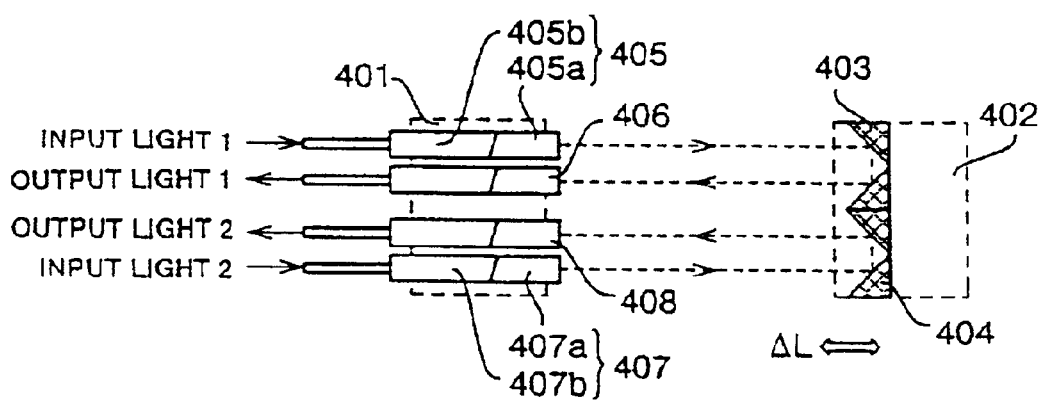
FIG. 4 is a schematic plane view showing a third embodiment of the light-signal delaying device (for simultaneous adjustment of a plurality of channels) according to the present invention.
Figure 5:
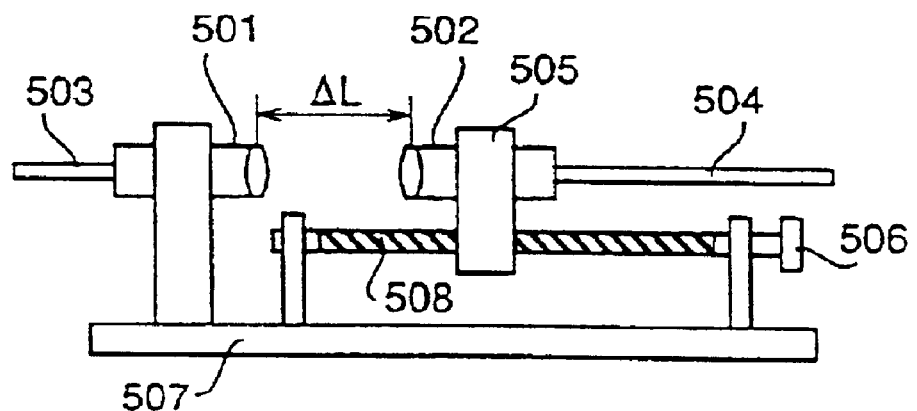
FIG. 5 is a schematic front view for explaining problems in a conventional light-signal delaying device.
Figure 6:
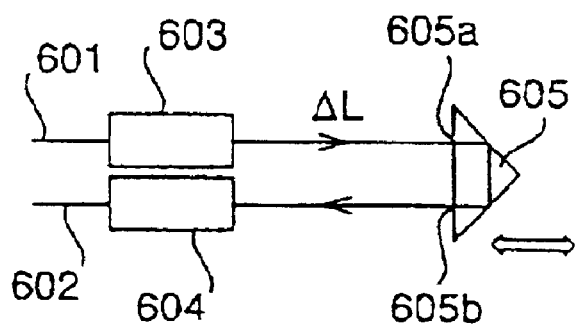
FIG. 6 is a schematic plane view for explaining problems in a conventional light-signal delaying device.

FIG. 4 is a schematic plane view showing a third embodiment of the light-signal delaying device according to the present invention. In this light-signal delaying device, a multi-channel unit is formed based on the light-signal delaying device shown in FIGS. 1A to 1C, wherein adjustment of the delay can be efficiently achieved for each channel group. That is to say, in this light-signal delaying device, light signals of a plurality of channels, which pass through the same path, are brought together into a light-signal group, so that the delay of the light signals can be adjusted among the groups.

In FIG. 4, a fixed stage 401 and a movable stage 402 are mounted on a linear guide rail (not shown). A first reflecting mirror mechanism 403 and a second reflecting mirror mechanism 404 are mounted on the movable stage 402. A first input optical-fiber collimator 405, a first output optical-fiber collimator 406, a second input optical-fiber collimator 407, and a second output optical-fiber collimator 408 are mounted on the fixed stage 401. The symbol ΔL indicates the distance between the optical fiber collimators 405 to 408 and the reflecting mirror mechanisms 403 and 404, that is, the stroke of the movable stage 402.

The first input optical-fiber collimator 405, the first output optical-fiber collimator 406, and the first reflecting mirror mechanism 403 form a light-beam transmission system of a first channel. The second input optical-fiber collimator 407, the second output optical-fiber collimator 408, and the second reflecting mirror mechanism 404 form a light-beam transmission system of a second channel. Light-beam transmission systems of a third channel, a fourth channel, and the like can be provided as needed.

Since both the fixed stage 401 and the movable stage 402 are mounted on one linear guide rail, as shown in FIGS. 1A to 1C, the reflecting mirror mechanisms 403 and 404 are moved along the linear guide rail simultaneously with the movement of the movable stage 402. Thus, the delay of the light signals of the first channel and the second channel can be adjusted at the same time. Also, the delay of the light signals can be accurately and efficiently adjusted among the plurality of channels by combining the first, the second, and the third embodiments.

As described above, in the present invention, the pair of optical fiber collimators is used to input and output the light signal; the optical fiber collimators are mounted on the fixed stage via the V-groove holder; and the pair of reflecting mirrors which is arranged on the movable translation stage such that reflecting surfaces thereof meet each other at 90°. The fixed stage and the movable stage are mounted on one linear guide rail, and the movable stage is moved along the linear guide rail so that the distance between the optical fiber collimators and the opposite reflecting mirrors can be varied. Since a reflecting mirror system is adopted and a plurality of reflecting mirror mechanisms is disposed in the light beam transmission path, a compact configuration can be realized, the optical transmission system is stabilized, and also transmission loss can be reduced. Furthermore, by using the optical fiber collimators formed of the GRIN lenses, the linear guide rail, the translation stage, and the like, a high-performance light-signal delaying device having a low insertion loss can be provided, in which the delay of the light signals can be adjusted over a wide range.

What is claimed is:

1. A light-signal delaying device comprising:
   a linear guide rail;
   a pair of stages engaged with the linear guide rail;
   a V-groove holder mounted on one of the stages;
   a pair of optical fiber collimators secured to the V-groove holder;
   a pair of reflecting mirrors mounted on the other stage in such a manner that reflecting surfaces thereof intersect at 90°; and
   an actuator for moving the state on which the reflecting mirrors are mounted along the linear guide rail,
   wherein each of the pair of optical fiber collimators is a GRIN lens having a pitch of 0.25, which is connected to an optical fiber;
   connecting end faces of the GRIN lens and the optical fiber are obliquely polished at 6° or more and connected to each other; and
   an anti-reflection film is formed on each light-beam incidence/exit end face.

2. A light-signal delaying device according to claim 1, wherein:
   one of the pair of stages to which the pair of optical fiber collimators is fixed is a fixed stage that is fixed at a predetermined position on the linear guide rail;
   the stage to which the pair of reflecting mirrors is fixed is a movable stage capable of moving along the linear guide rail; and
   each stage has a pressing mechanism for applying pressure in a direction perpendicular to the direction of movement of the linear guide rail to prevent a gap between the stages and the linear guide rail.

3. A light-signal delaying device according to claim 1, wherein each optical fiber used in the optical fiber collimators is any of a single mode fiber, a mode-dispersion shift fiber, and a polarization preserving fiber.

4. A light-signal delaying device according to claim 1, wherein:
   the pair of reflecting mirrors is a first reflecting mirror and a second reflecting mirror, which are arranged in such a manner that the reflecting surfaces meet each other at 90° and have an incidence angle and an exit angle of 45° with respect to incident light and exit light, respectively;
   the first reflecting mirror deflects the light beam incident from the first optical fiber collimator by 90° with respect to the optical axis, and reflects it toward the second reflecting mirror; and
   the second reflecting mirror deflects the incident light beam by 90° with respect to the optical axis, and reflects it along the optical axis of the second optical fiber collimator.

5. A light-signal delaying device according to claim 1, wherein:
   the V-groove holder has two V-grooves formed in parallel;
   one of the pair of optical fiber collimators is arranged in each of the V-grooves of the V-groove holder such that the optical axes are parallel to each other;
   the pair of reflecting mirrors is secured to the movable stage such that each of them faces the corresponding one of the pair of optical fiber collimators; and
   the light beam propagating between the optical fiber collimators can be sent to and received from the reflecting minors with a low transmission loss.

6. A light-signal delaying device according to claim 1, wherein the actuator for moving the movable stage is based on any one of a motor-driven ball screw mechanism, an air-driven cylinder mechanism, and a manual ball screw mechanism.

7. A light-signal delaying device according to claim 1, wherein each of the pair of reflecting mirrors has a metal film or a multilayer dielectric film formed on the reflecting surface thereof.

* * * * *